(12) United States Patent
Chen et al.

(10) Patent No.: US 8,196,734 B2
(45) Date of Patent: Jun. 12, 2012

(54) AUTOMATIC CONVEY DEVICE

(75) Inventors: Sung-Lin Chen, Taipei Hsien (TW);
Xiao-Lin Wu, Taipei Hsien (TW);
Shao-Bo Zhang, Taipei Hsien (TW);
Zai-Wei Zou, Taipei Hsien (TW); Jun Ma, Taipei Hsien (TW)

(73) Assignee: Cheng Uei Precision Industry Co., Ltd., Taipei Hsien (TW)

( * ) Notice: Subject to any disclaimer, the term of this patent is extended or adjusted under 35 U.S.C. 154(b) by 377 days.

(21) Appl. No.: 12/684,324

(22) Filed: Jan. 8, 2010

(65) Prior Publication Data
US 2011/0168526 A1 Jul. 14, 2011

(51) Int. Cl.
*B65G 27/10* (2006.01)
*B23K 31/02* (2006.01)

(52) U.S. Cl. ........ 198/429; 198/744; 198/746; 198/747; 198/742; 228/47.1

(58) Field of Classification Search ............... 198/418.7, 198/419.3, 429, 738, 741, 742, 743, 744, 198/746, 747; 228/47.1, 49.1, 49.5
See application file for complete search history.

(56) References Cited

U.S. PATENT DOCUMENTS

| | | | | |
|---|---|---|---|---|
| 3,547,254 A * | 12/1970 | Manetta | .................. | 198/718 |
| 3,960,310 A * | 6/1976 | Nussbaum | .................. | 228/6.1 |
| 4,288,023 A * | 9/1981 | Larrison | .................. | 228/110.1 |
| 4,504,008 A * | 3/1985 | Kent et al. | .................. | 228/180.21 |
| 4,813,222 A * | 3/1989 | Fukuda et al. | .................. | 57/274 |
| 5,040,665 A * | 8/1991 | Suzuki | .................. | 198/743 |
| 5,449,060 A * | 9/1995 | Mojden et al. | .................. | 198/419.1 |
| 5,730,630 A * | 3/1998 | Lacourse et al. | .................. | 439/876 |
| 6,905,059 B2 * | 6/2005 | Shafie | .................. | 228/39 |
| 7,845,541 B1 * | 12/2010 | Chen et al. | .................. | 228/41 |

\* cited by examiner

*Primary Examiner* — Mark A Deuble
(74) *Attorney, Agent, or Firm* — WPAT, P.C.; Anthony King

(57) ABSTRACT

An automatic convey device adapted for pushing and grouping a plurality of connectors includes a frame assembly, a holding module and a feeding module disposed on the frame assembly respectively. The holding module has a plurality of positioning units for positioning the connectors. The feeding module includes a power unit, a sliding unit disposed on the frame assembly, a plurality of pushing units and a grouping unit mounted to the sliding unit respectively. The pushing units are capable of repeatedly pushing the respective connectors move forward until the connectors are positioned by the positioning units and then move backward for repeating the last action to push the next connectors forward. The grouping unit is capable of repeating the action of pushing forward the connector positioned by the forward positioning unit and capable of being controlled by the power unit to disconnect with or connect with and push the corresponding connectors.

8 Claims, 7 Drawing Sheets

AUTOMATIC CONVEY DEVICE

BACKGROUND OF THE INVENTION

1. Field of the Invention

The present invention generally relates to a convey device, and more particularly to an automatic convey device.

2. The Related Art

Conventionally, an electric product usually needs to be soldered with a printed circuit board or other electric means for forming an electrical connection therebetween by simple manual operation. With the development of electronic field, machine operation is gradually instead of the manual operation for soldering the electric product with the printed circuit board or other electric means. A soldering machine which is used to solder the electric product with the printed circuit board or other electric means usually can handle a certain number of electric products once. However, at present, the action of feeding and grouping the electric products to the soldering machine only can be done by manual operation so that prolong the working time and increase in labor costs. Therefore, a device capable of feeding and grouping the electric products automatically is required.

SUMMARY OF THE INVENTION

An object of the present invention is to provide an automatic convey device adapted for feeding and grouping a plurality of connectors in succession, and controlled by a programming controlling module. The automatic convey device includes a frame assembly, a holding module fixed on the frame assembly for receiving the connectors at regular intervals from one end thereof and allowing the connectors be delivered out from the other end thereof, and a feeding module disposed on the frame assembly. The holding module has a plurality of positioning units arranged at regular intervals along a delivering direction of the connectors for temporarily positioning the respective connectors. The feeding module includes a power unit controlled by the programming controlling module wherein the power unit having a first driving device and a second driving device, a sliding unit movably disposed on the frame assembly along the delivering direction of the connectors and a direction opposite to the delivering direction by the driving of the first driving device, a plurality of pushing units corresponding to the positioning units mounted to the sliding unit at regular intervals, and a grouping unit mounted to the sliding unit and positioned in front of and spaced from the pushing units along the delivering direction. The pushing units are capable of repeatedly pushing the respective connectors move forward until the connectors are positioned by the respective positioning units and then move backward for repeating the last action to push the next connectors forward. The grouping unit is capable of repeating the action of pushing the corresponding connector forward for being positioned by the forward positioning unit and capable of being controlled by the second driving device to disconnect with or connect with and push the corresponding connectors.

As described above, the automatic convey device utilizes the feeding module for making the automatic convey device feed and group the connectors automatically so as to shorten the working time and reduce the labor costs.

BRIEF DESCRIPTION OF THE DRAWINGS

The present invention will be apparent to those skilled in the art by reading the following description, with reference to the attached drawings, in which.

DETAILED DESCRIPTION OF THE PREFERRED EMBODIMENT

Figure 1:
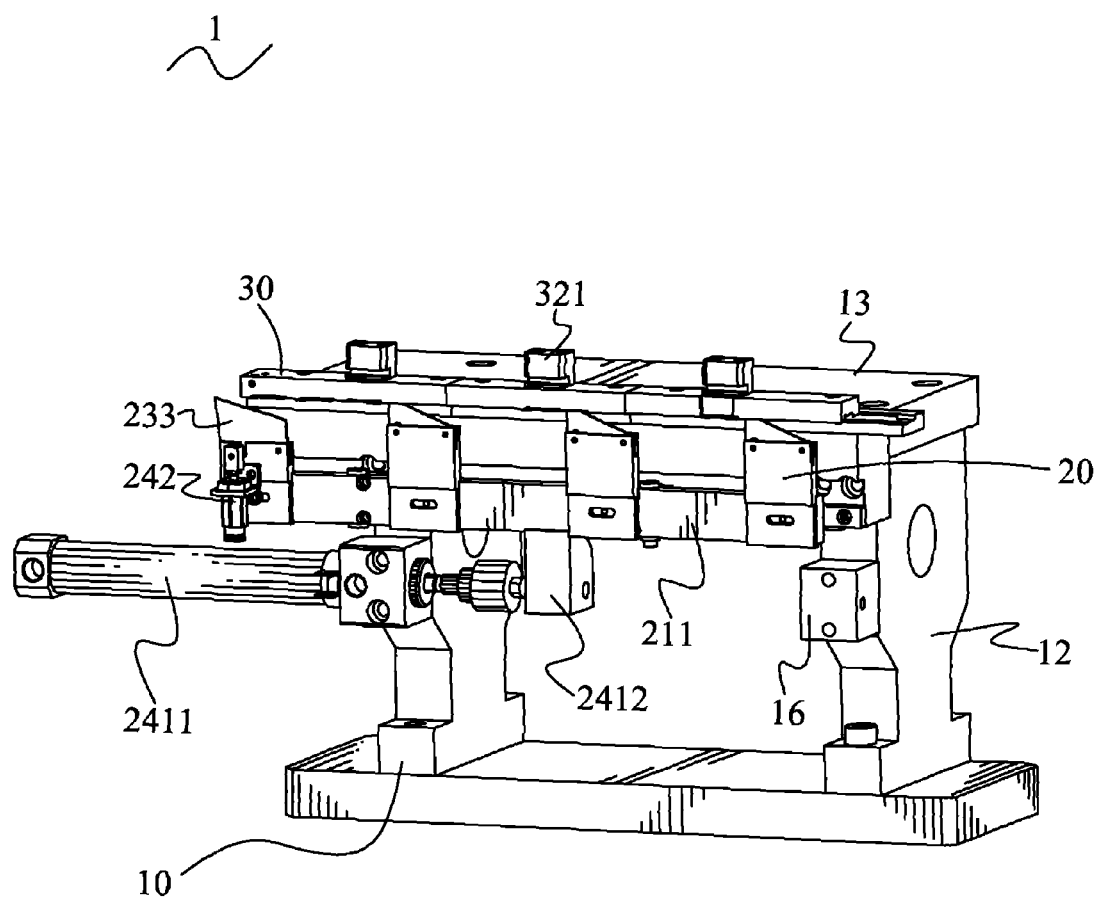
FIG. 1 is a perspective view of an automatic convey device in accordance with the present invention.
Figure 2:
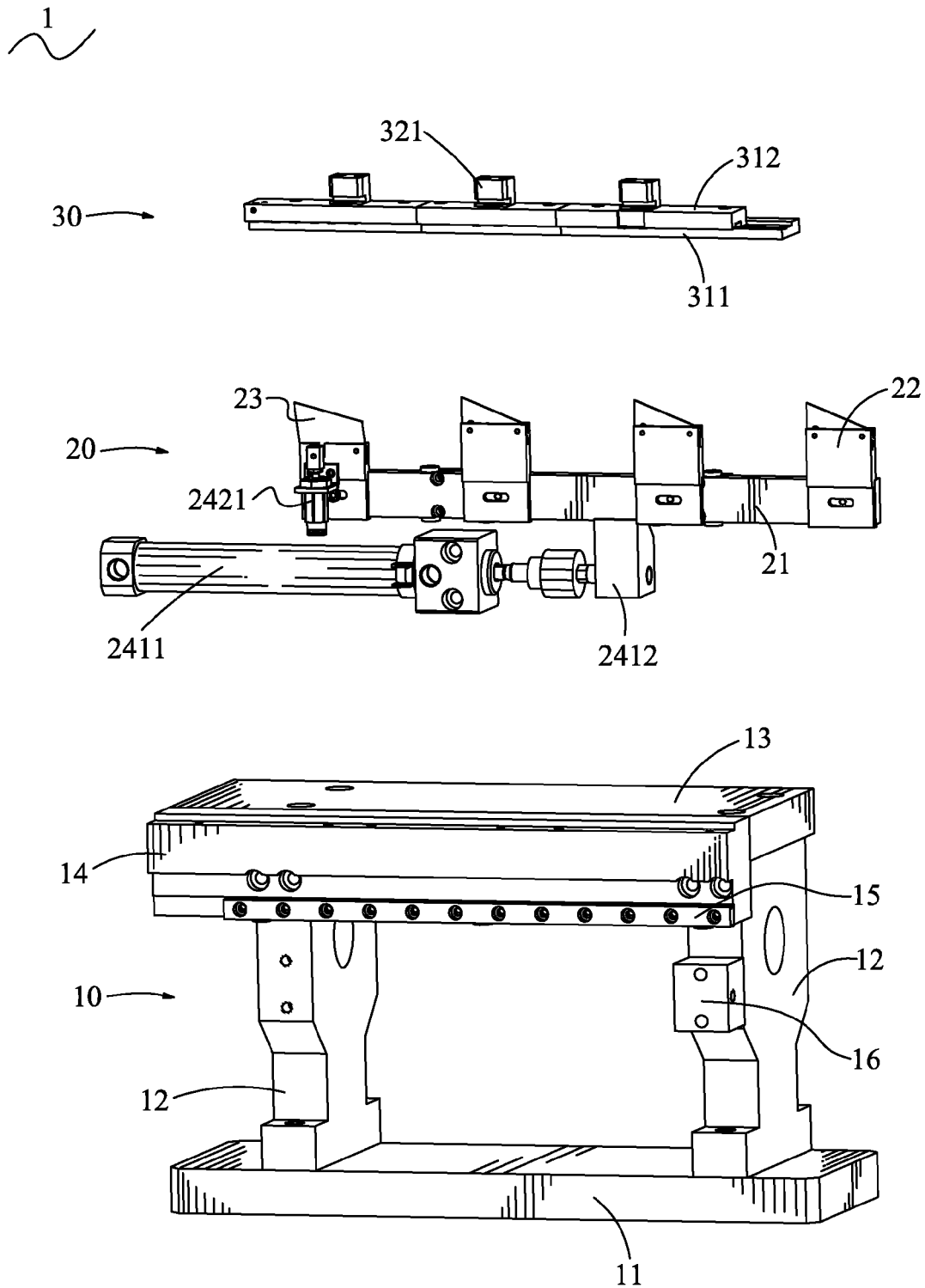
FIG. 2 is an exploded view of the automatic convey device of FIG. 1.
Figure 7:
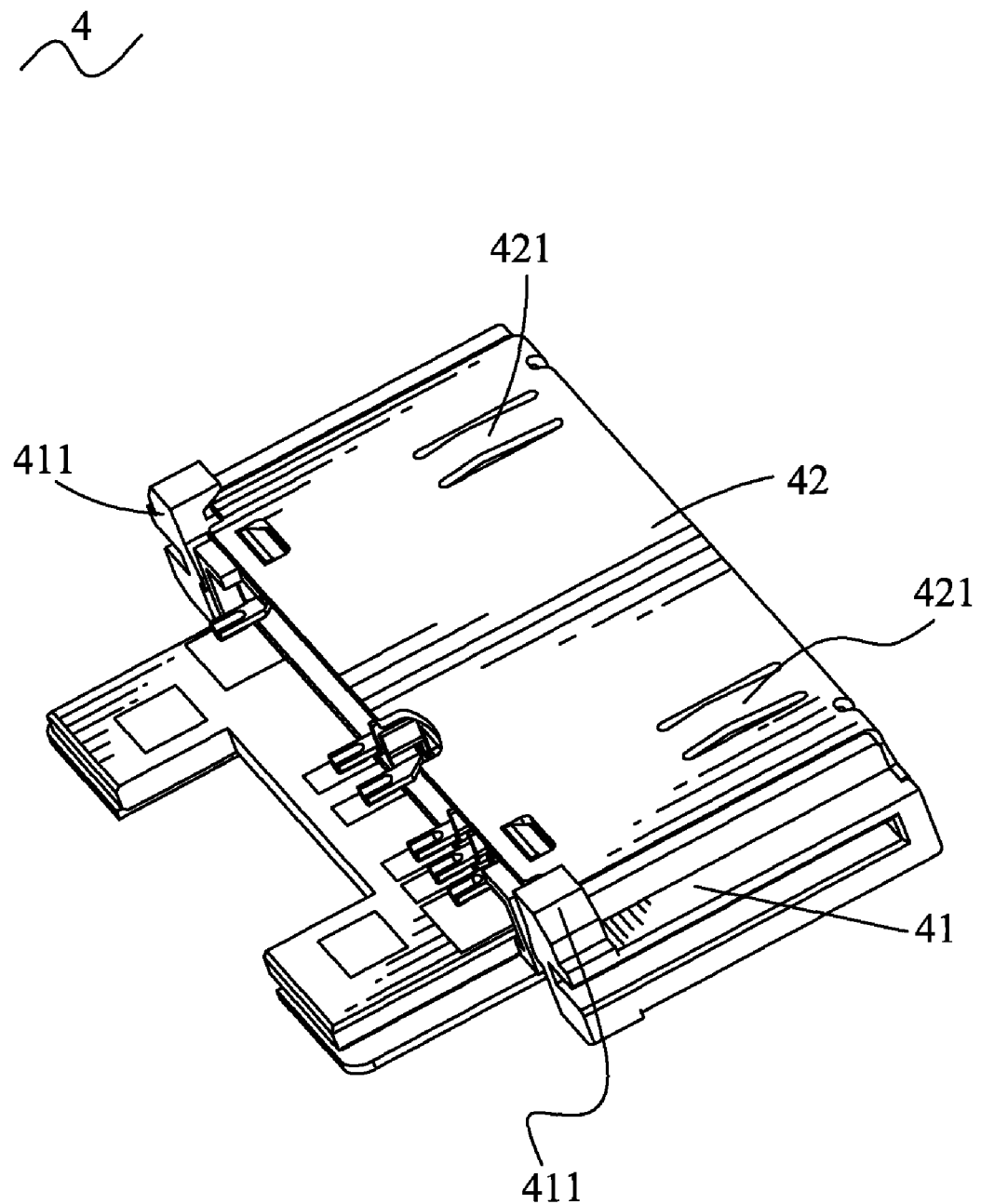
FIG. 7 is a perspective view of a connector delivered by the automatic convey device of FIG. 1.

Referring to FIG. 1, FIG. 2 and FIG. 7, an automatic convey device 1 in accordance with the present invention is shown. The automatic convey device 1 for feeding and grouping a plurality of connectors 4 in succession includes a frame assembly 10, a feeding module 20 and a holding module 30. The automatic convey device 1 is controlled by a programming controlling module (not shown). The programming controlling module is used for controlling the electrical operation and parameter settings of the automatic convey device 1. Herein, supposing the connectors 4 are delivered by the automatic convey device 1 along a right and left delivering direction, for clear description.

With reference of FIGS. 1-2, the frame assembly 10 has a substantial rectangular base body 11 disposed levelly. A pair of substantial rectangular supporting arms 12 are disposed vertically and fixed at two opposite ends of the base body 11, respectively. A platform 13 extends transversely with two opposite ends fixed on top edges of the two supporting arms 12. A beam 14 extending transversely is held on front surfaces of the two supporting arms 12 with a top surface thereof for being placed in the same plane as that of the platform 13. A rail 15 extending transversely is fixed in front of the beam 14. A substantial rectangular preventing block 16 is fixed in a substantial middle of the front surface of one supporting arm 12.

Figure 3:
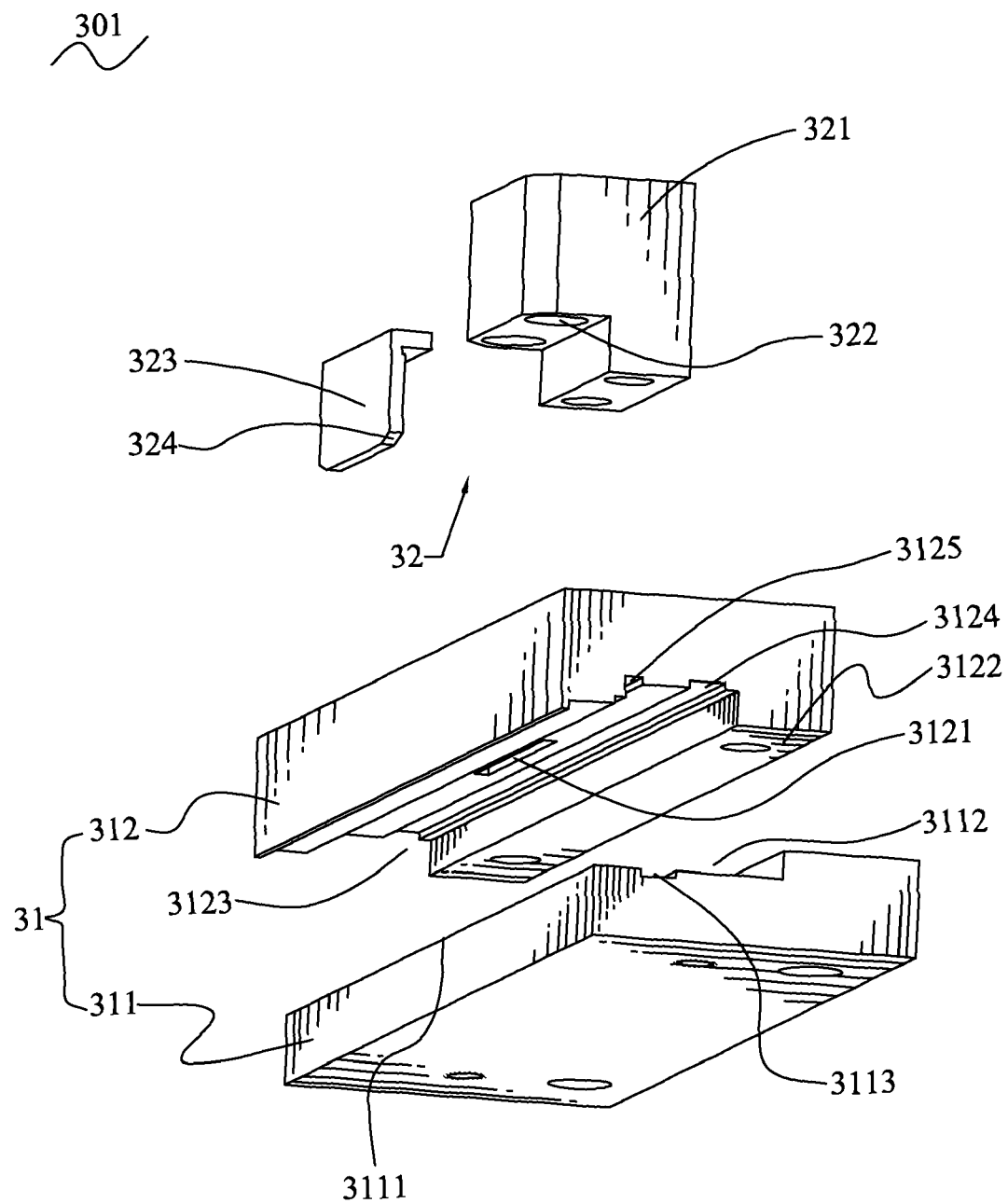
FIG. 3 is an exploded view of a holding module of the automatic convey device of FIG. 1.

Referring to FIGS. 2-3, the holding module 30 includes a plurality of holding units 301 successively connected with one another in a transverse direction. Each of the holding units 301 includes a locating device 31 and a positioning unit 32. The locating device 31 has a lower board 311 and an upper board 312 mated with each other. A front of a top surface 3111 of the lower board 311 is recessed downward to form a first receiving groove 3112 extending transversely to pass through two opposite side surfaces and a front surface of the lower board 311 to make the lower board 311 show a step-shape. A portion of the first receiving groove 3112 adjacent to the front surface of the lower board 311 is further recessed downward to form a first positioning groove 3113 extending transversely to the two opposite side surfaces of the lower board 311. The upper board 312 defines a rectangular receiving hole 3121 vertically passing through a middle thereof. A bottom surface 3122 of the upper board 312 defines a second receiving groove 3123 extending transversely to pass through two opposite side surfaces thereof, with a middle thereof communicating with the receiving hole 3121. Portions of the second receiving groove 3123 are further recessed upward to form a second positioning groove 3124 and a trough 3125 positioned in front of the second positioning groove 3124. The second positioning groove 3124 and the trough 3125 are at two opposite sides of the receiving hole 3121, parallel to each other and extend transversely respectively. A rear of the upper board 312 is fixed with a middle of the lower board 311 so that make the trough 3125 located beyond a front edge of the lower board 311.

The positioning unit 32 has a substantial rectangular pressing block 321 with a rear portion protruding downward to be fixed on a top of the upper board 312 of the locating device 31. The pressing block 321 defines a pair of receiving cavities 322 passing through a bottom surface thereof. A pair of first springs (not shown) is received in the corresponding receiving cavities 322. A substantial inverse-L pressing piece 323 is received in the receiving hole 3121 and exposed out from a bottom of the receiving hole 3121. The pressing piece 323 defines a pair of guiding surfaces 324 at two opposite bottom corners thereof. Bottom ends of the first springs abut against a top of the pressing piece 323 so that make the pressing piece 323 movably received in the receiving hole 3121 along a vertical direction.

Referring to FIGS. 2-5, the feeding module 20 includes a sliding unit 21 movably disposed on the frame assembly 10, a plurality of pushing units 22 corresponding to the positioning units 32 mounted to the sliding unit 21 at regular intervals, a grouping unit 23 mounted to the sliding unit 21 and positioned in front of and spaced from the pushing units 22 along a transverse direction, and a power unit 24. The sliding unit 21 has a supporting bar 211 extending transversely. A pair of substantial rectangular sliding blocks 212 spaced from each other is held in a substantial middle of a side of the supporting bar 211. A surface of each of the sliding blocks 212 which is parallel to the supporting bar 211 defines a sliding slot 213 transversely passing therethrough and communicating with outside. The two sliding blocks 212 are movably connected with the rail 15 of the frame assembly 10 by means of the sliding slots 213 so that make the supporting bar 211 slideable along the rail 15. The pushing units 22 are fixed on an opposite side of the supporting bar 211 of the sliding unit 21 and arranged at regular intervals along a transverse direction. The grouping unit 23 is fixed on the opposite side of the supporting bar 211 of the sliding unit 21 with all the pushing units 22 located at a side thereof and spaced from the adjacent pushing unit 22. Therefore, the pushing units 22 and the grouping unit 23 can slide along the rail 15 with the supporting bar 211 sliding along the rail 15.

Each of the pushing units 22 has a substantial rectangular first base board 221 disposed vertically, a first connecting rod 2221, a second connecting rod 2222 and a pushing piece 223. A middle of a top surface 2212 of the first base board 221 defines a first inserting groove 2211 extending transversely to pass through two opposite side surfaces of the first base board 221. The top surface 2212 of the first base board 221 further defines a columniform receiving aperture 2213 substantially superposing a portion of the first inserting groove 2211 and extending vertically with a lower end beyond a bottom of the first inserting groove 2211. The first base board 221 further defines a pair of first fixing apertures 2214 each longitudinally passing therethrough. The first fixing apertures 2214 are intersected with the first inserting groove 2211 and located at two sides of the receiving aperture 2213. The pushing piece 223 is of a substantial triangular shape. A first slope 2231 is formed at a top of the pushing piece 223 to smoothly connect a left end of the pushing piece 223 which is relatively high to a right end of the pushing piece 223 which is relatively low. The right end of the pushing piece 223 defines a first holding hole 2232 passing therethrough. The left end of the pushing piece 223 defines a first guiding groove 2233 passing therethrough and extending vertically. The pushing piece 223 is inserted into the first inserting groove 2211 of the first base board 221 with the first slope 2231 substantially exposed from the top surface 2212 of the first base board 221. A second spring (not shown) is received in the receiving aperture 2213. The connecting rods 222 are held in the corresponding first fixing apertures 2214 of the first base board 221, and the first connecting rod 2221 is further inserted into the first holding hole 2232 and the second connecting rod 2222 is further received in the first guiding groove 2233. Therefore, the pushing piece 223 can rotate around the first connecting rod 2221, and meanwhile the rotation range of the pushing piece 223 can be controlled by the cooperation of the second connecting rod 2222 and the first guiding groove 2233 of the pushing piece 223.

Figure 6:
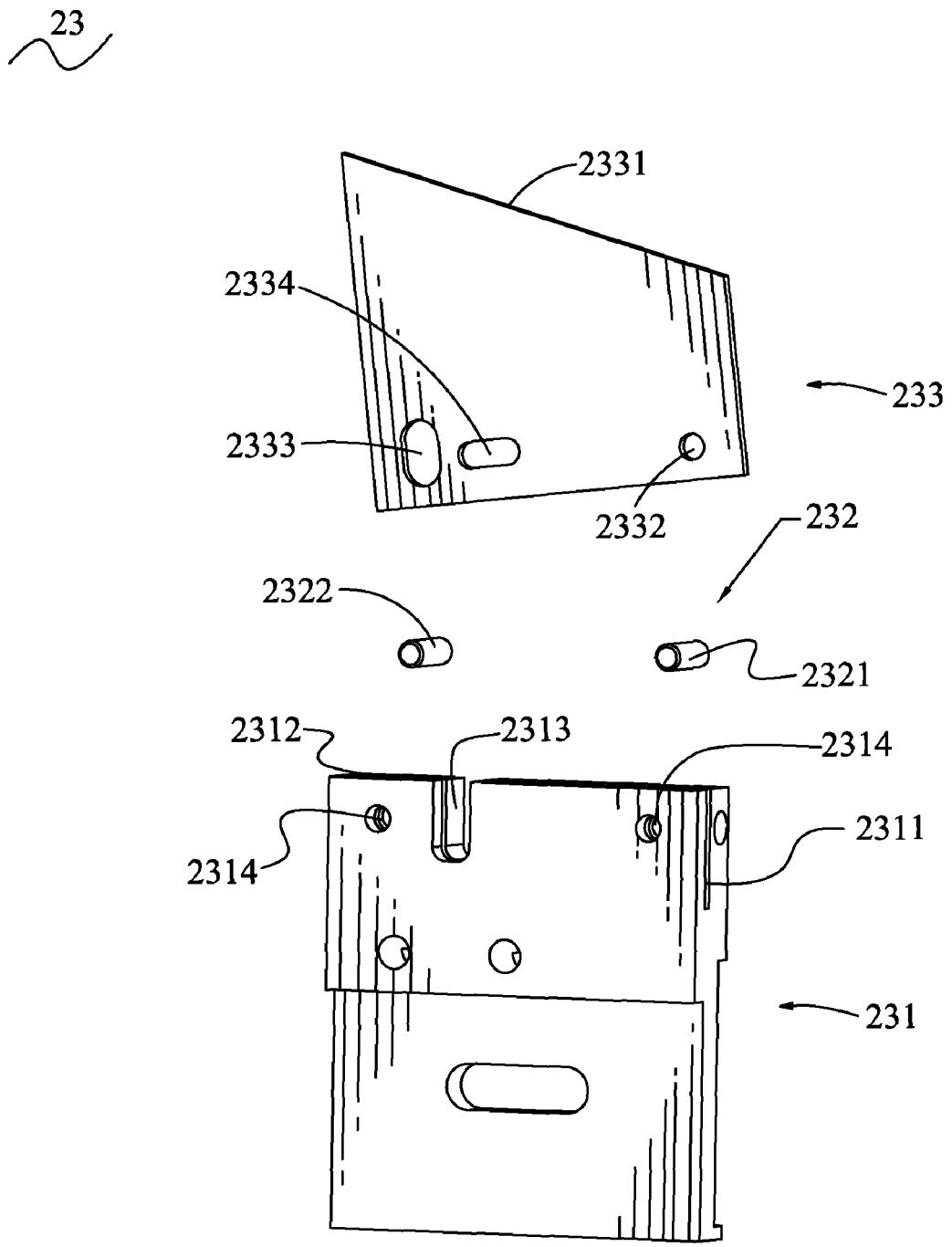
FIG. 6 is an exploded view of a grouping unit of the feeding module of the automatic convey device of FIG. 1.

Referring to FIG. 6, the grouping unit 23 has a second base board 231, a first bar 2321, a second bar 2322 and a grouping piece 233. A top surface 2312 of the second base board 231 defines a second inserting groove 2311 extending transversely to pass through two opposite side surfaces of the second base board 231. A substantial middle of the top surface 2312 of the second base board 231 defines a receiving gap 2313 longitudinally passing therethrough and extending vertically, with a bottom thereof higher than the second inserting groove 2311. The second base board 231 further defines a pair of second fixing apertures 2314 longitudinally passing therethrough and located at two sides of the receiving gap 2313. The grouping piece 233 has a second slope 2331 formed at a top thereof to smoothly connect a left end thereof which is relatively high to a right end thereof which is relatively low. The right end of the grouping piece 233 defines a second holding hole 2332 passing therethrough. The left end of the grouping piece 233 defines a second guiding groove 2333 passing therethrough and extending vertically, and a locating hole 2334 passing therethrough. The second guiding groove 2333, the locating hole 2334 and the second holding hole 2332 are aligned with each other in a transverse direction with the locating hole 2334 located between the second guiding groove 2333 and the second holding hole 2332. The grouping piece 233 is inserted into the second inserting groove 2311 with the second slope 2331 substantially exposed from the top surface 2312 of the second base board 231. The bars 232 are fixed in the corresponding second fixing apertures 2314 of the second base board 231, and the first bar 2321 is further inserted into the second holding hole 2332 and the second bar 2322 is further received in the second guiding groove 2333. Therefore, the grouping piece 233 can rotate around the first bar 2321, and meanwhile the rotation range of the grouping piece 233 can be controlled by the cooperation of the second bar 2322 and the second guiding groove 2333 of the grouping piece 233.

Figure 4:
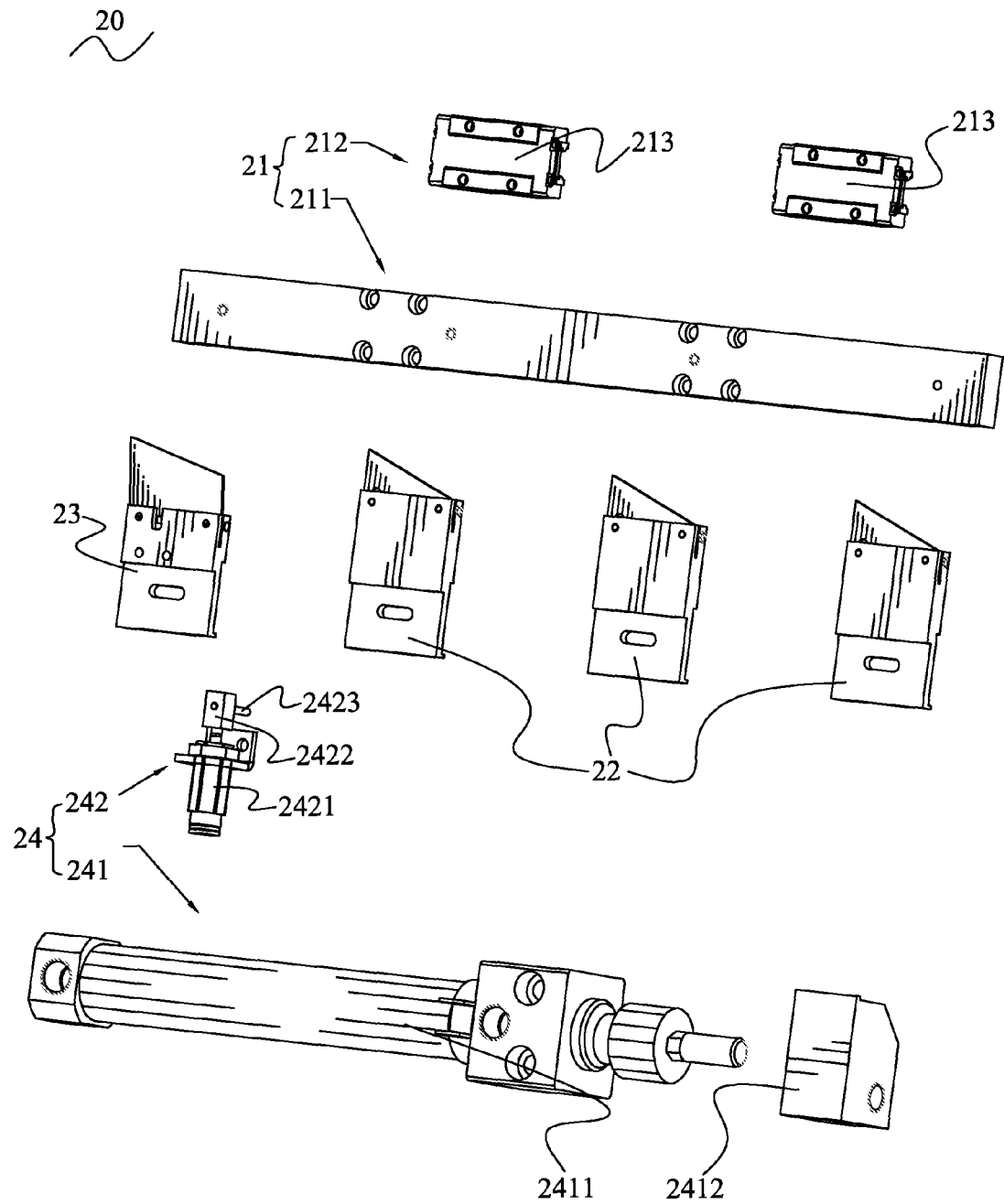
FIG. 4 is an exploded view of a feeding module of the automatic convey device of FIG. 1.
Figure 5:
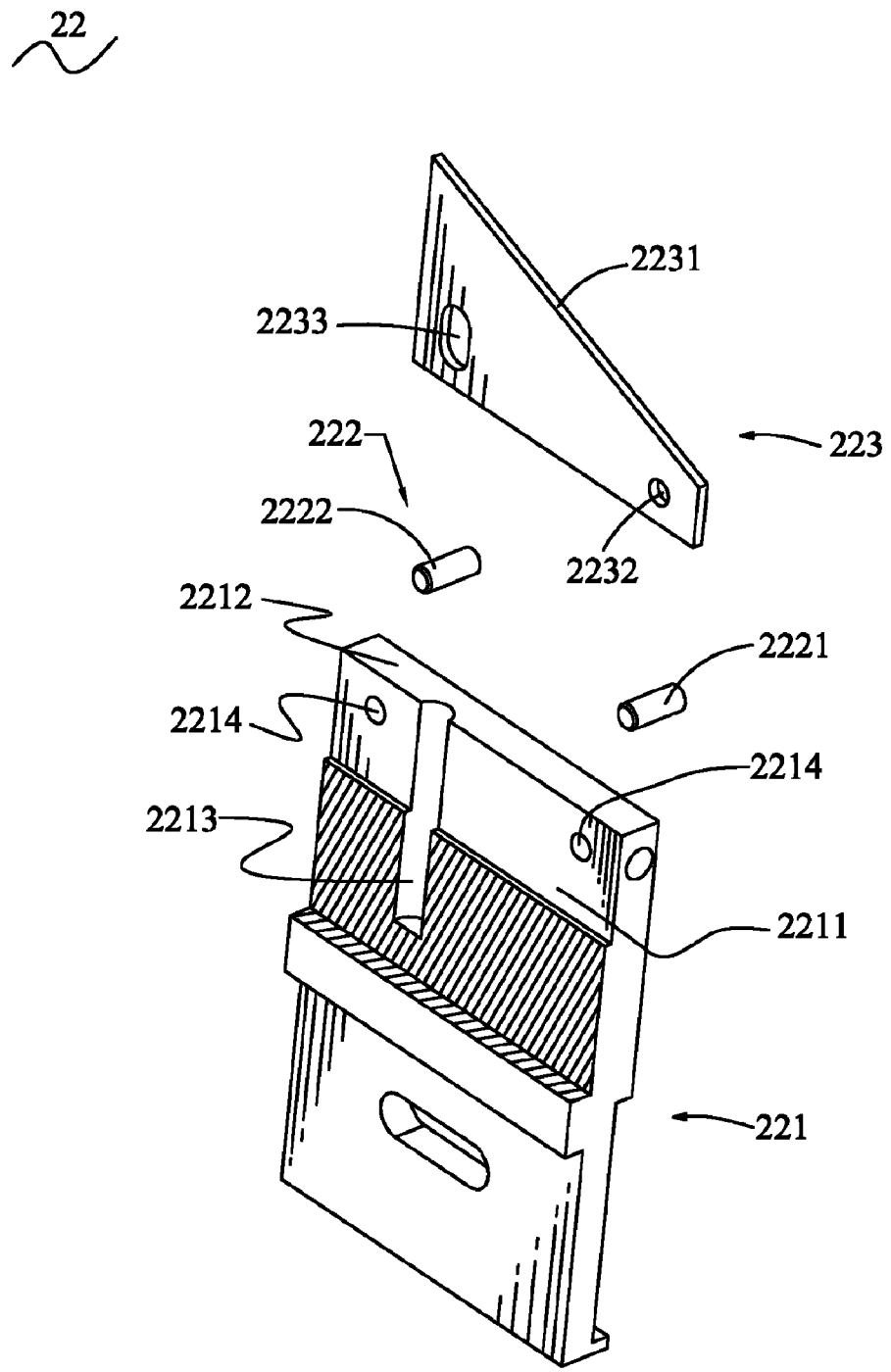
FIG. 5 is an exploded view of a pushing unit of the feeding module of the automatic convey device of FIG. 1.

Referring to FIG. 2 and FIG. 4, the power unit 24 has a first driving device 241 and a second driving device 242 connected with the programming controlling module, respectively. The first driving device 241 includes a first cylinder 2411 controlled by the programming controlling module and a holding block 2412. The first cylinder 2411 is held on the other supporting arm 12 of the frame assembly 10 which is different from the supporting arm 12 connected with the preventing block 16 and further connected with one end of the holding block 2412. The other end of the holding block 2412 is held on the supporting bar 211 of the sliding unit 21 of the feeding module 20 and beyond a bottom of the supporting bar 211 to be at a substantial same height as the preventing block 16 of the frame assembly 10. The first driving device 241 moves along a transverse direction when the first cylinder 2411 starts so that make the feeding module 20 moving along a transverse direction. The preventing block 16 which is fixed on the supporting arm 12 is used for preventing the holding block 2412 so as to control the movable range of the first cylinder 2411 and further control the movable range of the feeding module 20.

The second driving device 242 includes a second cylinder 2421 controlled by the programming controlling module, a pivoting block 2422 and a driving bar 2423 disposed levelly. One end of the pivoting block 2422 is held on a top of the second cylinder 2421. One end of the driving bar 2423 is connected with a middle of the pivoting block 2422. The other end of the driving bar 2423 is received in the receiving gap 2313 and further received in the locating hole 2334. Therefore, the left end of the grouping piece 233 which is relatively high can move vertically by the driving of the second cylinder 2421.

Referring to FIGS. 2-7, in assembly, the holding module 30 is transversely held on a top of the beam 14 of the frame assembly 10 with a front part of the lower board 311 of the locating device 31 exposed out of a front edge of the beam 14. The feeding module 20 is transversely held on a front of the beam 14 with the pushing pieces 223 and the grouping piece 233 can push the connectors 4 which are located between the upper board 312 and the lower board 311 and arranged at regular intervals along a transverse direction when the pushing pieces 223 and the grouping piece 233 are located at a relative upper position, and the pushing pieces 223 and the grouping piece 233 can not push the connector 4 when the pushing pieces 223 and the grouping piece 233 are located at a relative lower position.

Referring to FIG. 3 and FIG. 7, each of the connectors 4 has an insulating housing 41 of a substantial rectangular shape and a shell 42 mounted on the insulating housing 41. A front of a top of the insulating housing 41 is provided with a pair of spaced guiding blocks 411 aligned with each other in a transverse direction. Portions of the shell 42 protrude outward to form two pairs of elastic pieces 421 exposed from two opposite surfaces thereof respectively in a vertical direction and located in rear of the guiding blocks 411. The connector 4 is received in receiving grooves 3123, 3112 with part thereof exposed out of the front surface of the lower board 311. The guiding blocks 411 of the insulating housing 41 is received in the trough 3125 of the upper board 312 and can slide along the trough 3125. The two pairs of elastic pieces 421 of the shell 42 are received in the first positioning groove 3113 of the lower board 311 and the second positioning groove 3124 of the upper board 312 respectively so as to prevent the connector 4 falling off from the locating device 31.

Referring to FIGS. 2-7, in use, the automatic convey device 1 is electrically connected with an external power supply (not shown) through the programming controlling module and with all of the parameters of the programming controlling module set for controlling the automatic convey device 1. The connectors 4 are put on one end of the holding module 30 at regular intervals. An initial position of the feeding module 20 is defined to be at a right end of the automatic convey device 1, meanwhile, the left end of the grouping piece 233 of the grouping unit 23 is controlled at a relative lower position. The feeding module 20 moves leftward along the rail 15 by the driving of the first cylinder 2411 of the first driving device 241 so as to make the pushing units 22 and the grouping unit 23 of the feeding module 20 move leftward along the rail 15. The connector 4 is pushed by the corresponding pushing unit 22 for moving leftward along the receiving grooves 3123, 3112 of the locating device 31 for a certain distance, with the guiding blocks 411 of the insulating housing 41 moving along the trough 3125, until the connector 4 abuts against a right side of the pressing piece 323 of the positioning unit 32. The connector 4 continues sliding leftward through the corresponding guiding surface 324 of the pressing block 321 so that make the pressing piece 323 abut against a top of the connector 4. Therefore, the pressing piece 323 is pushed upward by the connector 4 so as to make the first spring which is against the top of the pressing piece 323 compressed upward.

Then the feeding module 20 moves rightward to back to the initial position of the feeding module 20 by the driving of the first cylinder 2411. The pushing unit 22 moves rightward with the first slope 2231 of the pushing piece 223 sliding rightward through a bottom of the connector 4 from the right end to the left end of the pushing piece 223. The pushing piece 223 is pressed by the connector 4 so as to move into the first inserting groove 2211 of the first base board 221 for making the second spring which is located under the pushing piece 223 shrunk into the receiving aperture 2213 of the first base board 221. The pressing piece 323 abuts against a top of the connector 4 for preventing the connector 4 moving rightward with the pushing piece 223. The pushing piece 223 of the pushing unit 22 automatically regains a free state by means of the stored elasticity of the second spring after the pushing piece 223 sliding over the connector 4. The feeding module 20 repeatedly moves back and forth by the driving of the first cylinder 2411 for certain times so as to make certain connectors 4 fed to the left side of the grouping unit 23 and aligned with each other. Then the grouping piece 233 moves upward to a relative upper position from the relative lower position by the driving of the second cylinder 2421. Then the first cylinder 2411 starts to make the grouping unit 23 moves leftward for pushing the certain connectors 4 to the next step process, at the same time, the pushing units 22 move leftward for feeding the connectors 4 to the left side of the grouping unit 23. The grouping piece 233 moves downward to the relative lower position from the relative upper position by the driving of the second cylinder 2421. The grouping piece 233 moves upward again when the number of the connectors 4 fed to the left side of the grouping piece 233 is the same as last time. Therefore, the automatic convey device 1 completes the action of feeding and grouping the connectors 4 automatically.

As describe above, the automatic convey device 1 utilizes the feeding module 20 for making the automatic convey device 1 feed and group the connectors 4 automatically so as to shorten the working time and reduce the labor costs.

The forgoing description of the present invention has been presented for purposes of illustration and description. It is not intended to be exhaustive or to limit the invention to the precise form disclosed, and obviously many modifications and variations are possible in light of the above teaching. Such modifications and variations that may be apparent to those skilled in the art are intended to be included within the scope of this invention as defined by the accompanying claims.

What is claimed is:

1. An automatic convey device adapted for feeding and grouping a plurality of connectors in succession, and controlled by a programming controlling module, comprising:

a frame assembly;

a holding module fixed on the frame assembly for receiving the connectors at regular intervals from one end thereof and allowing the connectors be delivered out from the other end thereof, the holding module having a plurality of positioning units arranged at regular intervals along a delivering direction of the connectors for temporarily positioning the respective connectors; and a feeding module disposed on the frame assembly, the feeding module including a power unit controlled by the programming controlling module wherein the power unit having a first driving device and a second driving device, a sliding unit movably disposed on the frame assembly along the delivering direction of the connectors and a direction opposite to the delivering direction by the driving of the first driving device, a plurality of pushing units corresponding to the positioning units mounted to the sliding unit at regular intervals, the pushing units capable of repeatedly pushing the respective connectors move forward until the connectors are positioned by the respective positioning units and then move backward for repeating the last action to push the next connectors forward, and a grouping unit mounted to the sliding unit and positioned in front of and spaced from the pushing units along the delivering direction, the grouping unit capable of repeating the action of pushing the corresponding connector forward for being positioned by the forward positioning unit and capable of being controlled by the second driving device to disconnect with or connect with and push the corresponding connectors.

2. The automatic convey device as claimed in claim 1, wherein the pushing unit includes a first base board disposed vertically and a pushing piece, a top of the first base board defines a first inserting groove extended along the delivering direction of the connectors, the pushing piece is received in the first inserting groove with part thereof exposed from the top of the first base board for pushing the corresponding connector and is up and down movable for backward passing over the next connector to repeat the last action to push the next connector forward.

3. The automatic convey device as claimed in claim 2, wherein the pushing piece has a first slope at a top thereof exposed out of the first inserting groove, one end of the first slope nearer to the grouping unit is higher than the other end of the first slope, the pushing piece is capable of rotating around a portion adjacent to the other end of the first slope for backward passing over the next connector by the next connector pressing the first slope downward gradually, the first base board further defines a receiving aperture substantially superposing a portion of the first inserting groove, the receiving aperture receives a second spring which is against a bottom of the pushing piece for moving the pushing piece upward after the pushing piece passes over the next connector.

4. The automatic convey device as claimed in claim 3, wherein the first base board further defines a pair of first fixing apertures intersected with the first inserting groove and located at two sides of the receiving aperture, respectively, the pushing piece defines a first holding hole at the portion adjacent to the other end of the first slope and a first guiding groove at a portion adjacent to the one end of the first slope, a first connecting rod is provided for pivotally connecting the pushing piece and the first base board by engagement with the first holding hole and the corresponding first fixing aperture, a second connecting rod is provided for being inserted in the first guiding groove and the corresponding first fixing aperture, the second connecting rod is up and down movable in the first guiding groove for allowing the rotation of the pushing piece and restricting the rotation range of the pushing piece.

5. The automatic convey device as claimed in claim 1, wherein the grouping unit includes a second base board disposed vertically and a grouping piece, a top of the second base board defines a second inserting groove extended along the delivering direction of the connectors, the grouping piece is received in the second inserting groove with part thereof exposed from the top of the second base board for pushing the corresponding connector and is up and down movable by the driving of the second driving device for selectively pushing forward the corresponding connectors positioned by the forward positioning unit.

6. The automatic convey device as claimed in claim 5, wherein the second base board further defines a receiving gap intersected with the second inserting groove, the second driving device is connected with a portion of the grouping piece through the receiving gap of the second base board.

7. The automatic convey device as claimed in claim 2, wherein the holding module includes a plurality of holding units successively connected with one another, each of the holding units includes one locating device and one positioning unit, the locating device includes a lower board held on the frame assembly and an upper board mated with the lower board for making the connector disposed therebetween, a front portion of the connector is beyond the lower board.

8. The automatic convey device as claimed in claim 7, wherein a front portion of the upper board is beyond a front edge of the lower board, the upper board defines a receiving hole vertically passing therethrough, the positioning unit includes a pressing piece movably received in the receiving hole along a vertical direction with a bottom extended out of the receiving hole, a pressing block with a receiving cavity fixed on a top of the upper board, and a first spring received in the receiving cavity and abuts against a top of the pressing piece, a bottom corner of the pressing piece farther from the grouping unit defines a guide surface for guiding the connector move forward under the bottom of the pressing piece and further be firmly pressed by the pressing piece because of the cooperation of the pressing piece and the first spring.

* * * * *